June 9, 1931.  E. N. FOX  1,809,407
PACKING
Filed May 15, 1922
Fig. 1.
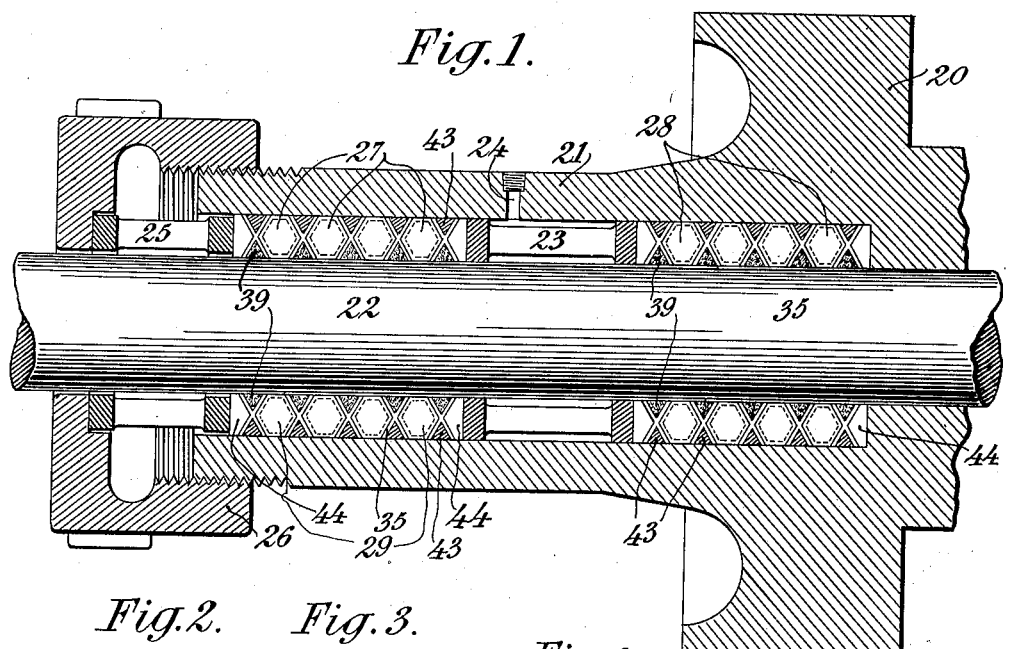
Fig. 2. Fig. 3.
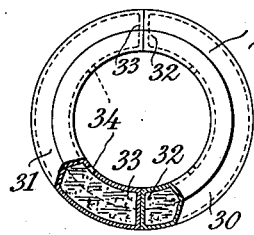 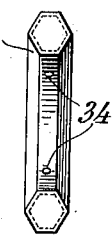
Fig. 6.
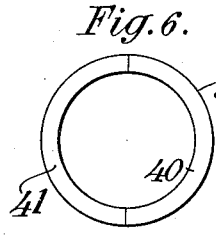
Fig. 7.
Fig. 4. Fig. 5.
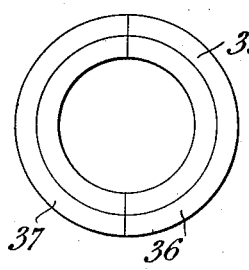 
Fig. 8. Fig. 9.
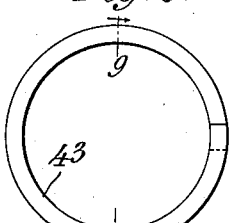 
Fig. 10.
Fig. 11
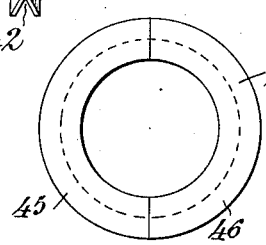
INVENTOR
Edgar N. Fox,
By Attorneys,
Fraser, Turk & Myers.

Patented June 9, 1931

1,809,407

UNITED STATES PATENT OFFICE

EDGAR N. FOX, OF PALMYRA, NEW YORK, ASSIGNOR TO THE GARLOCK PACKING COMPANY, OF PALMYRA, NEW YORK, A CORPORATION OF NEW YORK

PACKING

Application filed May 15, 1922. Serial No. 561,139.

This invention relates to improvements in packing particularly adapted for use in ammonia compressors and like machines but is adapted for general application if the materials employed be selected to suit the special requirements to be met.

One of the features of the invention is to provide a packing capable of standing up for long periods without adding lubrication and which will therefore yield a maximum amount of service with a minimum degree of attention.

Among the objects sought to be attained by the invention is the production of a packing adapted to satisfactorily prevent leakage of either gases or liquids and one which will be readily adjustable and may be satisfactorily maintained in actual contact with the surfaces of both the piston rod and the stuffing box.

It is a further object of the invention to produce a packing of the character described which will maintain an effective seal under wide variations of temperature and moisture.

Referring to the drawings illustrating the preferred form of the invention:

Figure 1 is a view in longitudinal cross section through a stuffing box with the improved packing assembled therein.

Figs. 2 to 11, inclusive, are detail views of the various elements of the improved packing.

Referring to Fig. 1, 20 designates a cylinder head from which extends a stuffing box 21 surrounding a piston rod 22. Within the stuffing box and surrounding the piston rod are the various elements of the packing hereinafter to be described. These elements may be divided into groups and separated by the usual oil lantern 23 to which oil may be supplied through an orifice 24. If desired an additional lantern 25 may be provided at the end of the stuffing box which may be closed by a follower in the form of an internally threaded nut 26.

The improved packing which, as disclosed, may if desired be divided into two or more groups of elements designated generally by the reference characters 27, 28, will now be described in detail.

The group of packing elements 27 which may be identical with the group 28 may comprise a series of lubricating rings 29 preferably of hexagonal cross section and each of which may for convenience of application and use be constructed as separable hollow sections 30, 31 (Figs. 2 and 3) closed by end walls 32, 33. These sections form containers for a lubricant preferably comprising a composition of heavy grease and graphite, openings or perforations 34 being provided in the inner wall of the ring sections for the escape of the lubricant.

The lubricating rings 29 are separated from each other by intervening expansion rings 35 of X shaped cross section. These rings are also for convenience of application made in separate sections 36, 37 (Figs. 4 and 5) and the arms of the X shaped sections are disposed at such angles that the surfaces of their lateral grooves conform with the lateral surfaces of the adjacent lubricating rings.

Within the inner grooves 38 (Fig. 5) of the X shaped rings are filler rings 39 which for convenience of application are made in the form of sections 40, 41 (Figs. 6 and 7) and the outer grooves 42 of the X shaped rings are filled by split rubber sealing rings 43.

Abutment rings 44, which may be made in separate sections 45, 46, (Figs. 10 and 11) may be provided at the ends of the group of packing elements. These abutment rings may have angular surfaces 47, 48 to conform with the surfaces of the lateral grooves of the end X shaped rings. Obviously if the group of sections were to terminate with hexagonal rings rather than X shaped rings the abutment rings would have reentrant surfaces rather than convex surfaces in order to conform with the same.

It will be seen that the group of packing elements of the forms illustrated and described completely fill the space in the stuffing box between its inner surface and the outer surface of the piston. Although it is essential that the material from which the elements of the packing are constructed shall be of sufficient rigidity to normally maintain a definite configuration it is also desirable that they shall be sufficiently yielding to provide for adjustments to compensate for differences of temperature and variations due to wear. This desired condition of the elements of the packing has been defined in the claims by specifying that the parts are "semi-rigid". Although not intending to limit the invention to the specific materials mentioned it may be stated that good results have been obtained by using lead as the material for the lubricating rings 29 and the abutment rings 44. The X shaped spacing rings may preferably be constructed of Babbitt metal and the filler rings 39 may also be made of a Babbitt composition. The sealing rings 43 will preferably be made of soft rubber.

In assembling the elements of the packing the various members will be so disposed as to cause the ends of the consecutive elements to break joints with each other thereby adding to the effectiveness of the seal. With the parts thus assembled the follower 26 will be drawn up until the packing elements are brought into close contact with the surfaces of the piston rod and stuffing box. In view of the semirigid material of which the parts of the packing are constructed this may be readily effected. Obviously if there is any slight space between the elements of the packing and said surfaces the elements will be caused to flatten out slightly until such space is filled. This flattening of the lubricating elements will bring their inner surfaces into contact with the piston rod and thereby facilitate the drawing or wiping out of the lubricant from the perforations 34. Likewise the slight flattening of the X shaped expansion rings will not only bring their inner and outer surfaces into close contact with the surface of the piston rod and the surface of the stuffing box, respectively, but will press the filler rings 39 into snug contact with the piston rod and press the rubber sealing rings 43 into close contact with the surface of the stuffing box.

Adjustments to compensate for wear may be effected from time to time as occasion may demand by slightly turning the follower 26.

It is to be understood that the invention is not intended to be limited to the specific form or to the specific materials of the embodiment herein disclosed but is capable of variations and modifications within the scope of the appended claims.

What I claim is:

1. An annular packing comprising a series of rings mounted side by side in coaxial relation, said series including hollow, perforated, lubricant containing, soft metal rings of convex polygonal cross section having outer and inner cylindrical walls and outwardly bulging annular uniting walls, and alternating soft metal rings having surfaces complemental to the adjacent surfaces of said hollow rings and filling the intervening annular spaces.

2. An annular packing comprising a series of semi-rigid rings mounted side by side in coaxial relation, said series including hollow perforated rings of hexagonal cross section having inner and outer cylindrical surfaces connected by opposed conical surfaces, said hollow rings being filled with lubricant, intervening rings of X shaped cross section having surfaces complemental to those of said hollow rings, and rings of triangular cross section filling the inner and outer annular grooves in said rings of X shaped cross section.

3. An annular packing comprising a series of semi-rigid rings mounted side by side in coaxial relation, said series including soft metal rings of X shaped cross section, rings of triangular cross section filling the inner and outer grooves thereof, and intervening hollow, lubricant-containing, soft metal rings, having surfaces complemental to those of the opposed lateral grooves in the consecutive X shaped rings filling the spaces therebetween.

4. An annular packing as specified in claim 3 in which the rings of triangular cross section filling the outer grooves in the X shaped rings are constructed of soft rubber.

5. An annular packing as specified in claim 3 in which the rings of triangular cross section filling the inner grooves in the X shaped rings are constructed of Babbitt composition.

6. An annular piston rod packing element comprising a circular segmental ring of semi-rigid material, X shaped in cross section, having a cylindrical inner working face, an outer cylindrical bearing face, and inner, outer and lateral recesses bounded by conical surfaces.

In witness whereof, I have hereunto signed my name.

EDGAR N. FOX.